(12) United States Patent
Menon et al.

(10) Patent No.: US 10,816,632 B1
(45) Date of Patent: Oct. 27, 2020

(54) 360-DEGREE 6-DEGREES-OF-FREEDOM TRACKING SYSTEM WITH SMALL FORM FACTOR DEVICES ENABLED BY LAMBERTIAN DIFFUSERS

(71) Applicant: Nod, Inc., Santa Clara, CA (US)

(72) Inventors: Harsh Menon, Cupertino, CA (US); Kim Ng, Foster City, CA (US); Alexander Weiss, Redwood City, CA (US); Anush Elangovan, San Francisco, CA (US); Aashik Ramachandrappa, Mountain View, CA (US)

(73) Assignee: NOD, INC., Santa Clara, CA (US)

( * ) Notice: Subject to any disclaimer, the term of this patent is extended or adjusted under 35 U.S.C. 154(b) by 233 days.

(21) Appl. No.: 15/905,397

(22) Filed: Feb. 26, 2018

Related U.S. Application Data

(60) Provisional application No. 62/463,442, filed on Feb. 24, 2017, provisional application No. 62/465,087, filed on Feb. 28, 2017.

(51) Int. Cl.
*G02B 5/02* (2006.01)
*G02B 13/20* (2006.01)
*G01S 1/70* (2006.01)
*G02B 1/04* (2006.01)
*G01S 5/16* (2006.01)

(52) U.S. Cl.
CPC ................ *G01S 1/70* (2013.01); *G02B 1/04* (2013.01); *G02B 5/0215* (2013.01); *G01S 5/16* (2013.01)

(58) Field of Classification Search
CPC .. G02B 5/0242; G02B 5/0278; G02B 5/0236; G02B 5/0221; G02B 5/02; G02B 5/021; G02B 5/0226; G02F 1/133504; G02F 1/133502; G02F 1/133524; G02F 2001/133607
USPC .......................................................... 359/599
See application file for complete search history.

(56) References Cited

U.S. PATENT DOCUMENTS

| 2007/0258149 A1* | 11/2007 | Gardner | ............... G02B 3/0056 |
| | | | 359/626 |
| 2014/0015748 A1* | 1/2014 | Lee | ........................ G01B 11/14 |
| | | | 345/158 |

\* cited by examiner

*Primary Examiner* — William R Alexander
*Assistant Examiner* — Tamara Y. Washington
(74) *Attorney, Agent, or Firm* — Pillsbury Winthrop Shaw Pittman LLP

(57) ABSTRACT

To accomplish 360-degree 6-DoF LED-based visual tracking, a tracked object has to be covered with sufficient number of LEDs so that when observed at any angle from an optical sensor, there are enough features to estimate the 6-DoF pose. Depending on the algorithm, typically, at least 4 feature points need to be seen in order to calculate the 6 DoF pose accurately. However, that would require many LEDs to be placed on the device for 360-degree visual coverage. As the number of LEDs increase, the device size increases because the LEDs need to be spaced out so that they will not fuse together into connected/overlapped blobs when seen from the optical sensor. Uniquely designed Lambertian Diffusers significantly reduce the number of LEDs required for 360 degree-6 DoF tracking and hence enable tracking with small form factor devices.

16 Claims, 4 Drawing Sheets

360-DEGREE 6-DEGREES-OF-FREEDOM TRACKING SYSTEM WITH SMALL FORM FACTOR DEVICES ENABLED BY LAMBERTIAN DIFFUSERS

CROSS-REFERENCE TO RELATED APPLICATIONS

This patent application claims priority to U.S. Provisional Ser. No. 62/463,442, filed Feb. 24, 2017, and U.S. Provisional Ser. No. 62/465,087, filed Feb. 28, 2017, the contents of both of which are hereby incorporated by reference herein in their entirety.

BACKGROUND

Technical Field

The disclosure relates to an optical marker-based tracking system with specially designed diffusers that enable small form factor devices for visual tracking.

Brief Description of the Prior Art

There are many existing approaches for tracking an object in 3D space. One approach uses radio wave technologies, such as RFID, GPS (Global Positioning System), LBS (Location-Based Service), RTLC (Real-Time Locating System). Another approach uses time of flight sensing, such as LIDAR or ultrasonic. Another approach uses 2D optical sensors, such as the Kinect. There are pros and cons of these systems. Some approaches work better outdoors than indoors; while some are more accurate than others. The comparison metrics can be cost, size, power consumption, accuracy, resolution/precision, whether they can track six degrees of freedom (6-DoF) or three degrees of freedom (3-DoF), point versus array sensors, working distance & conditions, line-of-sight requirement, active source versus passive sensing, marker-based versus markerless-based, etc.

Their common goal is to obtain the 3D pose of an object or multiple objects of interest and track them over time.

SUMMARY

The present disclosure describes details of an active optical marker-based tracking system that uses LEDs on the object being tracked to provide the visual features that are captured by an optical sensor to track motion. To accomplish 360-degree 6-DoF visual tracking, a tracked device/object of interest has to be covered with sufficient number of LEDs so that the device can be observed from any angle with enough number of features (LEDs) to be viewed by the optical sensor. Those features can be used in an algorithm to compute the 6 DoF pose of the object. Accuracy of pose determination depends on the algorithm being used. Typically, at least 4 feature points need to be seen in order to calculate the 6 DoF pose somewhat accurately. For 360-degree visual coverage with high accuracy, number of LEDs deployed is large. As the number of LEDs is increased, the device size also increases, because the LEDs need to be spaced out so that they do not fuse together into connected/overlapped blobs when viewed from the optical sensor. A new method has been devised that employs uniquely designed Lambertian Diffusers to significantly reduce the required number of LEDs required for 360 degree-6 DoF tracking and hence enables tracking with small form factor devices.

BRIEF DESCRIPTION OF THE DRAWINGS

The above aspects and other aspects and features will become apparent to those ordinarily skilled in the art upon review of the following description of specific embodiments in conjunction with the accompanying figures, wherein.

DETAILED DESCRIPTION OF THE EMBODIMENTS

Figure 1A:
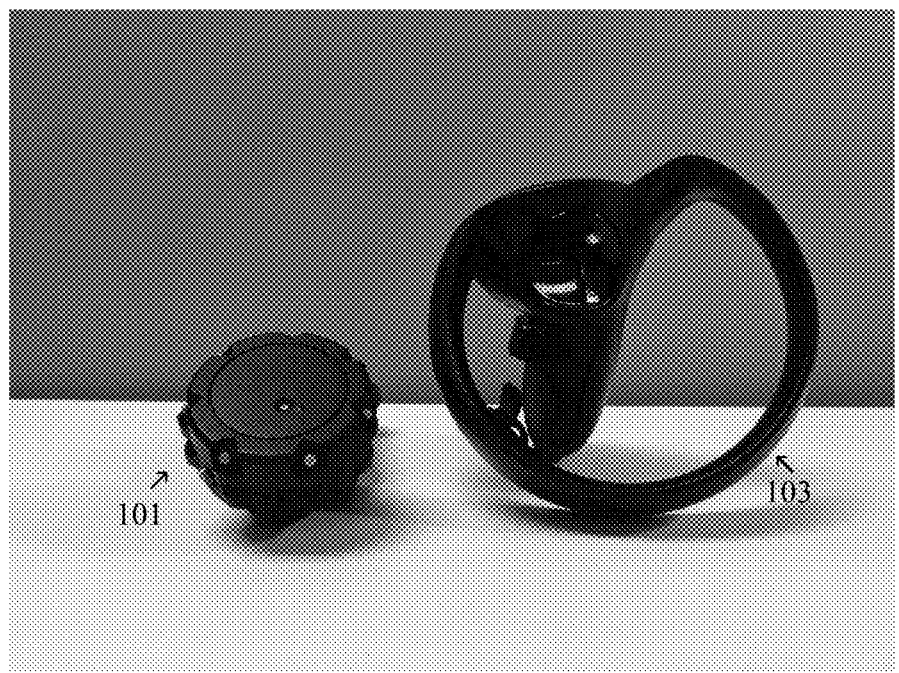
FIGS. 1(a) and 1(b) two different perspective views comparing a tracking device according to an embodiment of this disclosure (on the left), vis-à-vis an Oculus Touch device (on the right)

Embodiments of the present disclosure will now be described in detail with reference to the drawings, which are provided as illustrative examples so as to enable those skilled in the art to practice the embodiments. Notably, the figures and examples below are not meant to limit the scope to a single embodiment, but other embodiments are possible by way of interchange of some or all of the described or illustrated elements. Where certain elements of these embodiments can be partially or fully implemented using known components, only those portions of such known components that are necessary for an understanding of the embodiments will be described, and detailed descriptions of other portions of such known components will be omitted so as not to obscure the description of the embodiments. In the present specification, an embodiment showing a singular component should not be considered limiting; rather, the scope is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the scope encompasses present and future known equivalents to the components referred to herein by way of illustration.

LED-based Tracking Method

Many approaches exist in the literature to estimate the pose of an object using an optical sensor. One prominent approach is to use visual features to track an object from one position to the next. These features, while being used for tracking, are also useful for deriving poses of the tracked object. The estimated poses can be 3-DoF or 6-DoF depending on the estimation algorithm.

However, there is an issue with the feature-based optical tracking approach—when there is no visual feature on the object of interest, the object cannot be tracked and no pose can be estimated. This situation arises also when the lighting condition is not ideal (typically too dark or too bright) for the sensing algorithm to extract any meaningful features out of the image. Feature detection algorithms, such as SIFT (Scale-Invariant Feature Transform) and many other thereafter, are still not robust to the significant change in scene illumination. In other words, existing algorithms are still not invariant to the large variation in the image intensity.

Instead of relying on the illumination in the scene and the reflectance of the object of interest to provide the visual features, one can append, attach, or embed some light source, such as LEDs, onto a device that is designed to assist the object tracking. These LEDs can have their wavelength in any part of the electromagnetic spectrum and a camera can be designed to be sensitive to that specific wavelength so that it can observe the LEDs. These LEDs, when lit up, can provide the useful features/keypoints needed by an image processing algorithm.

For the object of interest to be tracked 360 degrees, this object will need to be covered by LEDs all around in order to have certain minimum number of LEDs (visual feature points) visible at all times, as required by the specific algorithm that is used for tracking and pose estimation.

For cost and power consumption as well as device size considerations, it is desirable to use as few LEDs as possible to achieve 360-degree tracking.

Embodiments of this disclosure, enabled by the combined effects of Lambertian Diffuser and LEDs, is capable to overcome the above constraints that enable us to design a small form factor tracking device. For comparison, the commercially available Oculus Rift CV1 has 50 LEDs evenly distributed on its surfaces and the Oculus Touch has 24 LEDs. Embodiments of this disclosure can achieve the same tracking accuracy with just 16 LEDs and the disclosed device size is much smaller than any of those two types of commercially available Oculus devices.

Figure 1B:
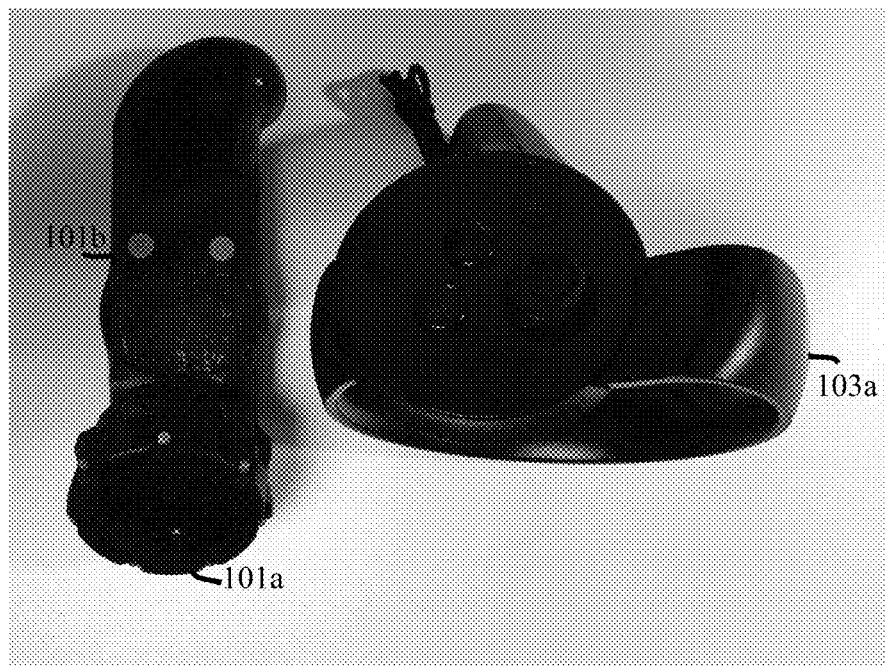

FIGS. 1(a) and 1(b) compare the commercially available Oculus Touch device with the invented device that can be tracked 360 degrees in 6 DoF. The Oculus Touch device is shown on the right, and the invented device is shown on the left in both FIGS. 1(a) and 1(b) from two different viewing angles. Specifically, FIG. 1(a) shows the invented device 101 on the left, and the Oculus Touch device 103, both viewed from the front. FIG. 1(b) also shows the invented device on the left, and the Oculus Touch device, but both devices are viewed from the top. It is clear from FIGS. 1(a) and 1(b) that the invented device has much smaller form factor. As mentioned above, just 16 LEDs are used in the invented device to be tracked in 360 degrees, although more LEDs can be placed on the handle 101b to increase the tracking robustness. The 16 LEDs are placed on the toroidal disc of 101a. Oculus's LEDs are also on the circular band 103a. The long portion 101b of the disclosed device is the handle; the toroidal disc 101a is mounted at the tip of the handle.

Combination of LEDs and Lambertian Diffuser

Figure 2:
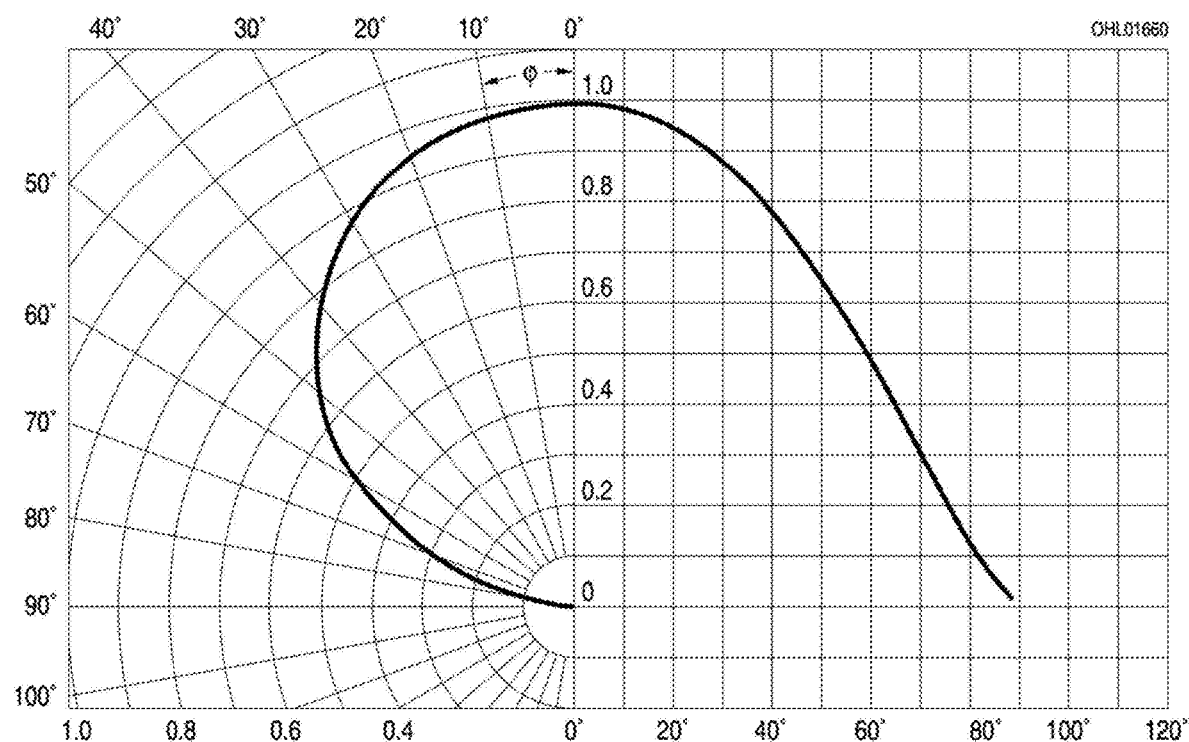
FIG. 2 illustrates a graphical representation LED light distribution without a Lambertian diffuser.

LED (Light-Emitting Diode) is a two-lead semiconductor light source. They are available across the visible, ultraviolet, and infrared wavelengths, with very high brightness. However, their optical emission angle is very small—very bright when viewed head-on (at 0 degree) but the brightness quickly diminishes as it is turned away. It shows the spatial distribution of light from the LED. Specifically, FIG. 2 shows the LED luminosity as a function of angular displacement from the LED centerline. The LED luminosity is maximum at the centerline (0 degree) and then falls off as the angular displacement increases. The chart in FIG. 2 illustrates the effect of viewing angle on the LED's brightness: brightness decreases as the viewing angle is changed away from 0 degree. Past 45 degrees, ~30% of the light is lost; past 60 degrees, ~50% of the light is lost. In other words, a bare LED is difficult to be seen by a camera when its emission axis is not perpendicularly aligned to the camera's optical axis; or, the LED would be more difficult to be detected as a blob or feature point when its intensity varies wildly to the viewing angle.

Lambertian Diffuser Description

The inventors designed a unique Lambertian Diffuser to direct the light emitted from each LED to widen the optical emission angle. The Lambertian Diffuser creates Lambertian diffusion (defined by the surface luminance being isotropic) across 180 degrees allowing a camera to identify it as a visual feature or keypoint in 180 degrees. In comparison, the typical bare LED (as described previously) is only identifiable as a keypoint in ~100 degrees and with diminishing brightness off axis. An 80% increase of optical emission angle allows for fewer LEDs and therefore smaller tracking devices.

The Lambertian diffusion of the light is achieved by manipulating the geometry of the diffuser according to the given material properties. Opacity and the index of refraction have the largest effect in the design of a Lambertian diffuser. This disclosure's chosen material is Polycarbonate since it is a low cost plastic that is easily mass produced and has a high index of refraction (1.58) which allows a thinner geometry for the diffuser. Another variable to consider is the surface finish of the Lambertian diffuser which is responsible for the final distribution of light. The ideal surface finish for Polycarbonate is "as machined" when produced on a lathe. This is a significant cost reducer because no post processing is required. If the Lambertian diffusers were to be manufactured by injection molding, a surface texture of around MT11000 is sufficient.

Figure 3A:
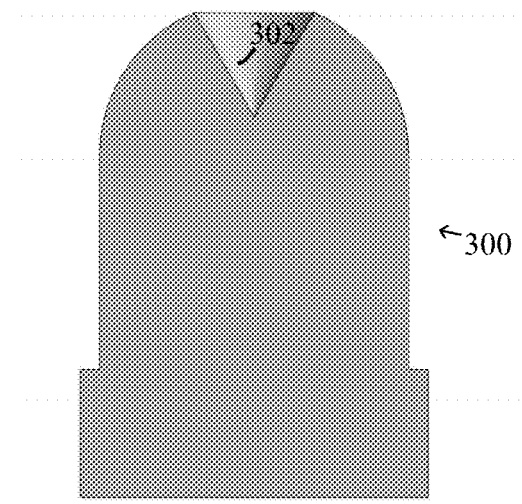
FIGS. 3(a) and 3(b) illustrate physical location of the Lambertian diffuser in the device.
Figure 3B:
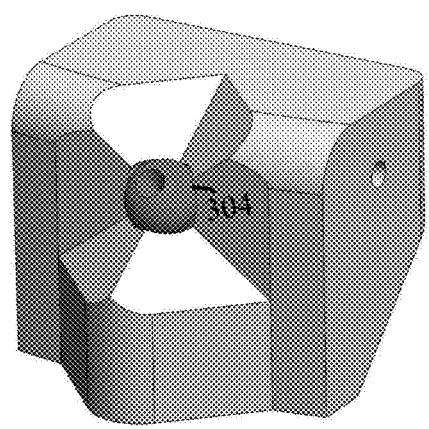
Figure 4:
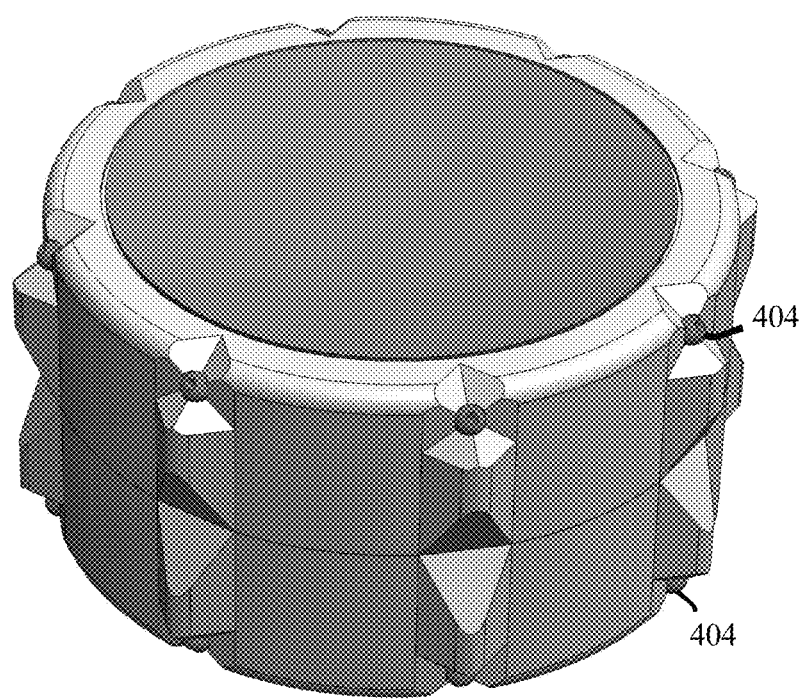
FIG. 4 illustrates how multiple Lambertian diffusers can be arranged in a toroidal arrangement to generate visual features.

FIGS. 3(a) and 3(b) show how an LED sits at the bottom of the uniquely designed Lambertian Diffuser in an embodiment of the present disclosure. In FIG. 3(a), a cut-out of a Lambertian diffuser unit 300 is shown with diffusing surfaces 302 at the top. FIG. 3(b) shows a LED 304 surrounded by diffusing surfaces of the Lambertian diffuser. FIG. 4 illustrates how multiple Lambertian diffuser units can be arranged in a toroidal arrangement (as shown in FIG. 1(a)) to generate visual features for the optical sensor. In this particular example, 16 LEDs (elements 404) are used, but the number of LEDs may vary depending on design and tracking accuracy requirement.

In conjunction with the unique Lambertian Diffuser design, the inventors use a unique arrangement of multiple of them to increase the number of keypoints in a scene while keeping the form factor of the device small; that will be beneficial for marker based tracking methods which require a minimum number of keypoints to be visible in order to be tracked and a pose computed. In addition, these keypoints must maintain a minimum spacing in order for them not to be identified as a single keypoint. The minimum spacing is defined by the projected image of all the visible "Lambertian diffused" LEDs onto the image sensor plane. Each keypoint on the projection must be a minimum pixel distance from its neighbors, or else one keypoint would eclipse the other. The inventors place the Lambertian diffused LEDs in a toroidal arrangement and uses precise "occluded" surfaces to prevent eclipsing on the projected image plane.

Effect of LED combined with Lambertian Diffuser

LED becomes visible, with even brightness, across 180 degrees using a Lambertian style diffuser. When the brightness is even, this eases the image processing/computer vision algorithm to detect and identify the LED.

Applications

A small form factor device that can be tracked 360 degrees in 6 DoF can enable many applications. Practically, it can be attached onto any object of interest and have that object being tracked by camera(s) continuously and smoothly. For example, it can be used for an indoor robot navigation; hand controllers and head mounted display (HMD) for virtual reality and augmented reality. These are merely non-limiting illustrative applications.

In summary, this disclosure describes a tracking device that combines LEDs and Lambertian Diffusers for use as visual features. In various embodiments, the device creates the visual features that have larger emission angle, thus can be seen with larger field of view. The combination can be used for object tracking, 360-degree tracking, object pose estimation, including 360-degree pose estimation, 6-DoF pose estimation, and 3-DoF pose estimation, or a combination thereof. The device may combine LEDs and Lambertian Diffusers with special geometry to avoid adjacent LEDs being fused into one blob. The combination minimizes the number of LEDs needed for 360 degree coverage. The device may enable requiring a specified minimum number of LEDs visible from any given angle.

The disclosure has been described in terms of particular embodiments. Other embodiments are within the scope of the following claims. For example, the steps of the disclosure can be performed in a different order and still achieve desirable results. While certain representative embodiments and details have been shown for purposes of illustrating the disclosure, it will be apparent to those skilled in the art that various changes in the methods and apparatus disclosed herein may be made without departing from the scope of the disclosure which is defined in the appended claims.

The invention claimed is:

1. An optical marker device disposed on an object whose movement is to be tracked by an optical sensor, the optical marker device comprising:
   a plurality of Lambertian diffusers arranged externally on the object; and
   a plurality of light emitting diodes (LEDs), each LED being housed within its respective Lambertian diffuser in such a way that light emitted from the LED interacts with its respective Lambertian diffuser and leaves the optical marker device at a substantially enhanced emission angle for ease of being captured by the optical sensor.

2. The device of claim 1, wherein each LED with its respective Lambertian diffuser provides one or more visual features that are captured by the optical sensor for tracking movement of the object.

3. The device of claim 1, wherein the device is used for 360-degree tracking.

4. The device of claim 1, wherein the device is used for estimating a pose of the object being tracked.

5. The device of claim 4, wherein the device is used for estimating the pose of the object in six degrees of freedom.

6. The device of claim 4, wherein the device is used for estimating the pose of the object in three degrees of freedom.

7. The device of claim 4, wherein the device is used for estimating the pose of the object in 360 degrees.

8. The device of claim 7, wherein the device is used for estimating the pose of the object in six degrees of freedom.

9. The device of claim 7, wherein the device is used for estimating the pose of the object in three degrees of freedom.

10. The device of claim 1, wherein the plurality of LEDs and their respective Lambertian diffusers are arranged in a toroidal fashion along an external surface of the object.

11. The device of claim 1, wherein the spatial arrangement of the plurality of the LEDs and geometry of their respective Lambertian diffuser is designed to avoid light emitted from adjacent LEDs to fuse into a single blob when captured by the optical sensor.

12. The device of claim 11, wherein number of LEDs needed to cover 360-degree object tracking is reduced because of the design of the geometry of the Lambertian diffuser.

13. The device of claim 11, wherein a specified minimum number of LEDs are visible from any given angle.

14. The device of claim 1, wherein the Lambertian diffuser is made of Polycarbonate.

15. The device of claim 14, wherein the Polycarbonate has an index of refraction of 1.58.

16. The device of claim 1, wherein a surface texture of light diffusing surfaces of each Lambertian diffuser is MT11000.

* * * * *